March 4, 1941.  V. W. WILSON  2,233,802
REGENERATION OF SPENT LEAD SOLUTION
Filed Feb. 11, 1938
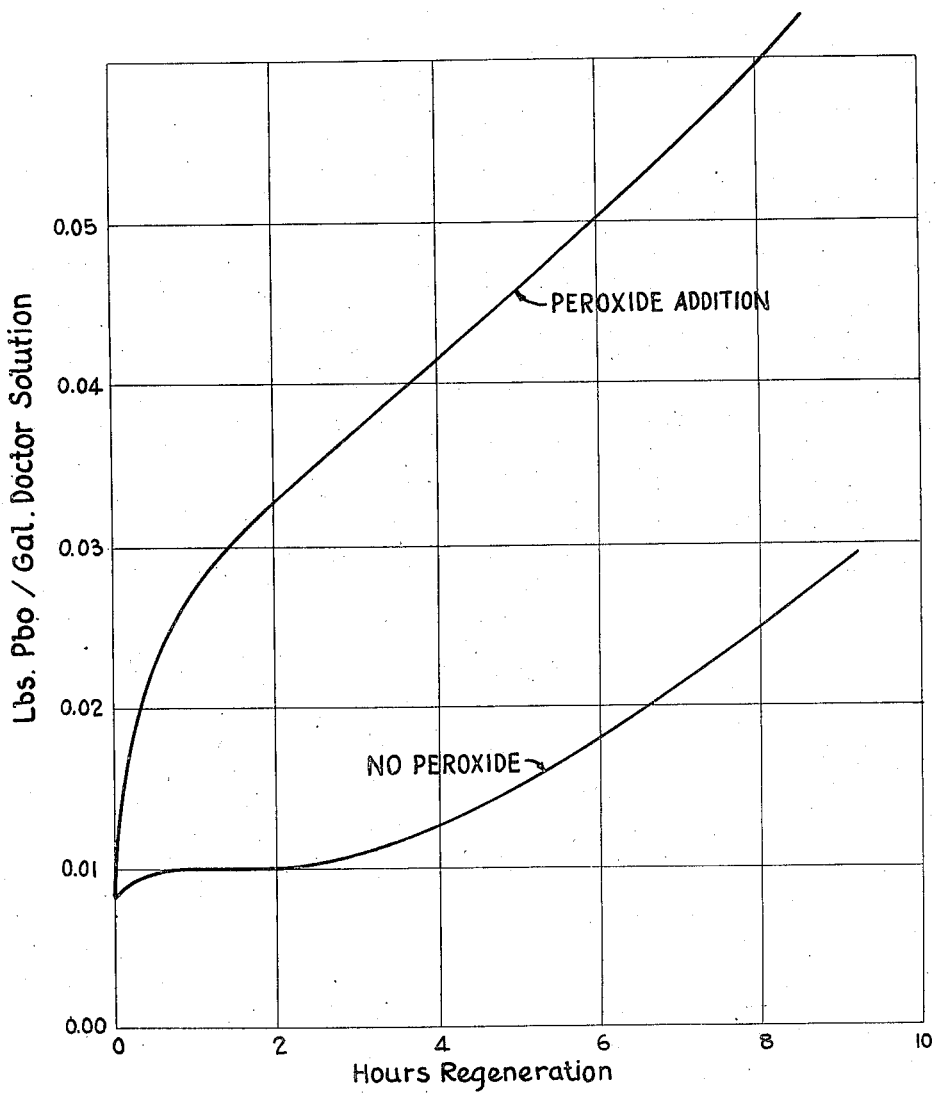
INVENTOR
Virden W. Wilson,
BY
Beau, Brooks, Buckley + Beau.
ATTORNEYS Patented Mar. 4, 1941

2,233,802

UNITED STATES PATENT OFFICE 2,233,802

REGENERATION OF SPENT LEAD SOLUTION

Virden W. Wilson, Buffalo, N. Y., assignor to Buffalo Electro-Chemical Company, Inc., Buffalo, N. Y.

Application February 11, 1938, Serial No. 190,134

5 Claims. (Cl. 23—146)

The present invention relates to the treatment of spent doctor solutions used in the purification of hydrocarbon distillates and more particularly to the regeneration, revivification and reclaiming of such spent doctor solutions.

Hydrocarbon distillates having a distillation range of ordinary motor fuel or kerosene contain in most instances undesirable compounds whose removal must be effected before a marketable product is obtained. Distillates containing these undesirable products are said to be sour and the distillate is subjected to a sweetening procedure prior to use.

Compounds most commonly producing sour distillates are the mercaptans or thio alcohols, organic sulfur compounds of the type RSH, where R represents either an aliphatic or aromatic radical. These undesirable mercaptans exert certain corrosive effects upon internal combustion engines and auxiliary apparatus. In addition, the mercaptans exert an undesirable influence upon the color and the odor of the gasoline. It is also believed that the presence of these compounds tends to increase the rate of gum formation in a finished hydrocarbon distillate to the point where the distillate will no longer function properly in an internal combustion engine.

Many methods have been suggested heretofore for converting the deleterious mercaptans into innocuous products and methods have also been suggested for removing these troublesome compounds. Those treating procedures that have had any widespread acceptance in the trade have depended mainly upon the conversion of the mercaptans to the comparatively harmless disulfides that are soluble in the hydrocarbon distillate. These products may be represented by the general formula R—S—S—R' where R and R' represent organic radicals. It is this conversion that is designated as "sweetening." The sweetening procedure most commonly used at present involves treatment of the sour distillate with an aqueous solution of sodium plumbite in an excess of caustic alkali; this solution is designated as the "doctor solution" and the complete treatment is often designated "the doctor treatment."

The reactions involved are in many cases complex, and the exact mechanism of the reaction is not definitely known. However, the general reactions involved may be expressed by the following equation, (1) $2RSH + Na_2PbO_2 = R\text{—}S\text{—}Pb\text{—}S\text{—}R + 2NaOH$ The organic lead compound designated as R—S—Pb—S—R, formed during the reaction between the mercaptan and the sodium plumbite, is soluble in the hydrocarbon distillate and the final step comprises changing the soluble lead compound to an insoluble lead compound plus an organic disulfide soluble in the hydrocarbon. This reaction is effected by addition of the requisite quantity of free sulfur and is represented in Equation 2.

(2) $R\text{—}S\text{—}Pb\text{—}S\text{—}R + S = R\text{—}S\text{—}S\text{—}R + PbS$ At the completion of the reaction represented by Equation 2 where the theoretical quantity of free sulfur, usually dissolved in gasoline, has been added to the solution being treated, an insoluble precipitate of black lead sulfide is suspended throughout the solution and must be removed, as by decantation, centrifuging and the like.

In commercial operations many attempts have been made to recover the insoluble lead sulfide and convert the same to lead oxide, dissolving the lead oxide in caustic alkali and regenerating the sodium plumbite or doctor solution. Where all of the lead of the doctor solution has not been changed to lead sulfide, the incompletely spent solution may be again used for treating additional distillate. In general, the lead sulfide is removed in any conventional way and attempts made to oxidize the same to lead oxide.

In general, the lead sulfide is converted to lead oxide by heating and blowing the spent doctor solution with air. In proceeding in this manner, the entire mass of lead sulfide is maintained at a temperature of about 175 to 225° F. and the whole mass blown with air for a period of from about 20 to 36 hours, suitable means, such as pressure, being employed to prevent substantial vaporization of the solution medium and consequent appreciable change in the caustic concentration. At the termination of the heating and blowing period the converted lead oxide is removed by dissolving the same in caustic soda. In normal operation, the amount of lead sulfide regenerated is roughly proportional to the time of blowing, provided that a considerable excess of lead sulfide is maintained in the solution at all times. On the other hand, if an insufficient quantity of air be used for stirring so that a considerable portion of the suspended lead sulfide settles and does not come in contact with air, very slow regeneration results.

It is an object of the present invention to materially hasten the regeneration of lead sulfide and the change to lead oxide and to effect this regeneration economically.

The results of the present invention are obtained by adding to the spent doctor solution a material generating hydrogen peroxide and blowing the mixture with air at an elevated temperature. By the addition of a small quantity of hydrogen peroxide to the spent doctor solution the regeneration is materially speeded up and, additionally, is carried to a much higher level with the recovery of a greater quantity of lead as lead oxide. The function of the hydrogen peroxide appears to be twofold; one, a direct oxidation of the lead sulfide to litharge upon addition of hydrogen peroxide to the spent doctor solution, and, two, the elimination by means of the added active oxygen of certain substances present in spent doctor solution which act to inhibit the air oxidation of lead sulfide.

Since in the present invention it has been found that the oxidation effects obtained by the use of hydrogen peroxide or materials generating hydrogen peroxide are considerably in excess of that predicted by the addition of the hydrogen peroxide alone, an apparent catalytic effect is realized in addition to any straight oxidation that may occur.

The broad concept of the present invention, therefore, comprises treatment of spent doctor solution with a material generating hydrogen peroxide while blowing the solution with air. The quantity of active oxygen generating material, as, for instance, hydrogen peroxide, added to the spent doctor solution is about 10 to 30% of the quantity theoretically required to bring the lead oxide content of the doctor solution up to the original concentration. A given spent doctor solution, if blown with air at an elevated temperature, would be regenerated to a specified PbO content in twenty-four hours, as an example, while with hydrogen peroxide alone the same specified PbO content would be reached in from eight to twelve hours. However, by using the combined active oxygen and molecular oxygen treatment, that is to say, the peroxide-air blowing treatment, the same specified PbO content can be reached in from one and one-half to two hours.

The following table sets forth the results of a plant run wherein spent doctor solution having a PbO content of about 0.008 pound PbO per gallon of solution was treated in accordance with procedures of the present invention and the regeneration of PbO determined at stated intervals and compared with the increase in PbO content of a sample of the same solution blown with air but without addition of peroxide. The run was made upon two samples each consisting of 200 barrels of spent doctor solution. To one of the samples was added 34 liters of 100 volume hydrogen peroxide diluted to 50 liters. The hydrogen peroxide was added all within the first half-hour of treatment. The results set forth in Table I are shown graphically in Fig. 1.

TABLE I

ANALYSES FOR LITHARGE CONTENT

*Litharge content, lbs. PbO/gal.*

| Description | Tank with $H_2O_2$ | Tank without $H_2O_2$ |
|---|---|---|
| Original | 0.0075 | 0.0088 |
| ½ hour | 0.025 | 0.0100 |
| 1 hour | 0.029 | 0.0098 |
| 2 hours | 0.032 | 0.010 |
| 3½ hours | 0.040 | 0.011 |
| 4 hours | 0.040 | 0.0103 |
| 5 hours | 0.045 | 0.0165 |
| 6 hours | 0.051 | 0.0175 |
| 7 hours | 0.0535 | 0.0200 |
| 8 hours | 0.0583 | 0.0285 |

The temperature of both tanks was maintained at 160°–170° F. during the treatment and the same quantities of air ware supplied to each tank under identical conditions.

In examining the curve in Fig. 1, it will be noted that very little regeneration of PbO or change of PbS to PbO occurred in the first few hours of air blowing and then as the regeneration is initiated the rate of regeneration apparently increases until a curve of apparently constant slope is obtained, undoubtedly falling off as the concentration of PbS decreases and that of PbO increases. In examining the regeneration curve of the run in which hydrogen peroxide was used, it will be noted that the initial lag is overcome, a substantial quantity of PbS changed to PbO within the first few hours and then the rate of regeneration proceeding at a more rapid rate, as shown by the steeper curve, than that of the straight air blowing. The remarkable result obtained by the procedure of the present invention is apparent by a comparison of the results after six hours blowing, the PbO content having risen sharply from 0.008 to 0.051 in contrast with peroxide. This is in contrast to the slight increase in PbO content from 0.008 pound PbO per gallon to 0.0175 pound per gallon. A difference of 0.0335 pound PbO per gallon is obtained with the active oxygen-molecular oxygen treatment as contrasted to an increase of only 0.0095 with molecular oxygen alone. From a study of these curves it would appear that some compounds are present in the completely spent doctor solution which inhibit the start of the regeneration of PbO or change of PbS to PbO when air alone is used as the regenerating medium. These compounds are apparently destroyed by the addition of hydrogen peroxide or materials generating hydrogen peroxide, thus permitting the regeneration to take place more rapidly and efficiently. Thus, in order to obtain a regenerated solution of 0.05 pound PbO per gallon, regeneration with air alone would require an enormous time of blowing since approximately the first four hours of this operation does not materially increase PbO content but is used merely to destroy or overcome the retarding influences present preventing immediate change of lead sulfide to lead oxide. From experience with the prior processes, the time required to obtain a PbO content of 0.05 pound PbO per gallon would be 20 to 24 hours.

In operating the present invention upon a practical scale the lead sulfide sludge and spent doctor solution containing lead compounds is separated from the gasoline and the sulfide sludge centrifuged to eliminate as much of the hydrocarbon as possible, the last traces being eliminated by steaming to open up the same and make subsequent chemical action and wetting of the sulfide possible. Solids in the solution are kept in suspension by convection currents from the steaming and by air blowing.

When sufficient gasoline has been removed so that the lead sulfide may be wet with aqueous solutions, a material generating hydrogen peroxide in solution is added, the temperature of the solution being maintained below that at which rapid decomposition of the peroxide is effected without equivalent oxidation. Usually hydrogen peroxide, as for instance, 100 volume or other concentration, is added. The peroxide may be added all at once or in small amounts over a period of half an hour to an hour or more. Air is then passed into the solution and the solution agitated therewith. Generally, the temperature of the solution in this phase is higher than during the peroxide addition and may rise to about 200° F., more or less.

Although illustrative results are shown by the use of hydrogen peroxide, other materials producing hydrogen peroxide in solution, as, for instance, sodium peroxide, sodium perborate, the percarbonates and the like and, in general, those substances of the general formula X—O—O—X' where X and X' may be hydrogen, metal, organic or inorganic radicals, will serve to effect the regeneration in conjunction with air blowing.

What is claimed is:

1. The method of regenerating spent lead solution containing lead sulfide which comprises treating the solution with a material generating hydrogen peroxide and agitating the solution with air.

2. The method of regenerating spent lead solution containing lead sulfide which comprises adding a material generating hydrogen peroxide to the solution and passing air through the solution.

3. The method of regenerating spent lead solution containing lead sulfide which comprises adding to the solution a material generating hydrogen peroxide in quantity insufficient to change the lead sulfide to lead oxide and passing air through the solution to agitate the same and aid in oxidation of the lead sulfide.

4. The method of regenerating spent lead solution containing lead sulfide which comprises adding to the solution a material generating hydrogen peroxide and thereafter passing air through the solution at a higher temperature.

5. The method of regenerating spent lead solution containing lead sulfide which comprises treating the solution simultaneously with air and with a material generating hydrogen peroxide.

VIRDEN W. WILSON.